(12) United States Patent
Bodett et al.

(10) Patent No.: US 6,242,039 B1
(45) Date of Patent: Jun. 5, 2001

(54) STABILIZED EGG FLAVORING COMPOSITIONS

(75) Inventors: Susan Patricia Bodett, Grayslake, IL (US); Martin Preininger, Munich (DE)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/384,821

(22) Filed: Aug. 27, 1999

(51) Int. Cl.[7] .............................. A23L 1/32; A23L 1/222; A23L 1/20
(52) U.S. Cl. ........................ 426/614; 426/431; 426/650; 426/651; 426/605
(58) Field of Search ..................................... 426/614, 431, 426/650, 651, 605

(56) References Cited

U.S. PATENT DOCUMENTS

| | | | |
|---|---|---|---|
| 2,844,470 | 7/1958 | Akerboom | 99/144 |
| 3,114,645 | 12/1963 | Blanken et al. | 99/210 |
| 4,524,083 | 6/1985 | Liot | 426/330.1 |
| 4,675,202 | 6/1987 | Wenger et al. | 426/614 |
| 4,808,425 | 2/1989 | Swartzel et al. | 426/399 |
| 4,853,238 | 8/1989 | Huang | 426/241 |
| 4,923,707 | 5/1990 | Schoenberg | 426/602 |
| 4,957,760 | 9/1990 | Swartzel et al. | 426/399 |
| 5,019,407 | 5/1991 | Swartzel et al. | 426/399 |
| 5,039,543 | 8/1991 | Lee et al. | 426/533 |
| 5,096,728 | 3/1992 | Rapp | 426/330.1 |
| 5,314,706 | 5/1994 | Colarow et al. | 426/605 |

*Primary Examiner*—Anthony J. Weier
(74) *Attorney, Agent, or Firm*—Fitch, Even, Tabin & Flannery

(57) ABSTRACT

The present invention includes a stabilized food flavoring composition for imparting the flavor of egg to foods that includes egg yolk treated at elevated temperature or that contains an aqueous extract of hard cooked egg yolk. The invention also includes a food flavoring composition for imparting the flavor of egg that has substantially reduced levels of fat and cholesterol. The invention also provides methods of preparing an egg-flavored food composition. In these methods, a food preparation to be flavored with egg flavoring is combined with a stabilized flavoring composition for imparting the flavor of egg that includes either egg yolk treated at an elevated temperature or an aqueous extract of hard cooked egg yolk, or both.

19 Claims, No Drawings

STABILIZED EGG FLAVORING COMPOSITIONS

FIELD OF THE INVENTION

This invention relates to flavoring edible compositions with egg flavor, and to methods of preparing such edible compositions. The egg flavor is derived from egg yolk.

BACKGROUND OF THE INVENTION

In recent years there has been a strong desire on the part of the consuming public to eat foods that are intended to enhance health and prolong life. As a result of numerous studies related to diet and public health, consumer foods low in total fat and cholesterol are in demand. Among the food compositions which have been developed in response to this increased demand are mayonnaise spreads that are low in fat or are fat-free and pourable salad dressings similarly low in fat. In addition other types of low fat or fat-free food compositions, such as desserts, including cakes, custard desserts, pies, and so forth, have also been developed.

Eggs are often used in conventional food product. Unfortunately, eggs are rich in fats, lipids, and cholesterol; these components are found primarily in the egg yolk. Mayonnaise spreads, certain types of salad dressings, and desserts such as custards and puddings generally contain eggs. Although many food compositions can be made by eliminating eggs, especially the egg yolks, the resulting food compositions are generally adversely affected. For example, the elimination of eggs often results in poorer flavor, texture, and odor. Thus, such food products resulting from the simple elimination of eggs have generally not received high acceptance by consumers.

Numerous attempts have been made to provide such foods with acceptable organolrptic properties and/or to treat eggs or egg products to make more acceptable to diet or health conscious consumers. For example, U.S. Pat. No. 2,844,470 to Akerboom et al. relates to pasteurizing egg yolk material at higher temperatures and for longer periods without causing significant denaturation changes in the egg protein, and to the use of pasteurized egg yolk so obtained in edible dressing compositions that are less susceptible to microbiological spoilage.

U.S. Pat. No. 4,675,202 to Wenger et al. relates to a process for sterilizing an aqueous egg yolk slurry wherein the slurry is acidified to pH values less than 6.0 and then sterilized under ultra high temperature conditions, specifically temperatures from 128° C. to 155° C. A process for preparing sterilized food products containing the sterilized egg yolk is also disclosed.

U.S. Pat. Nos. 4,808,425 and 4,957,760 to Swartzel et al. disclose a method of ultrapasteurizing a liquid whole egg product in a continuous flow system. U.S. Pat. No. 5,019,407 to Swartzel et al. relates to pasteurizing a liquid whole egg product by separately heating a stream of egg yolks and a stream of egg whites to different temperatures and then recombining the streams. An apparatus for carrying out this process is also disclosed.

U.S. Pat. No. 4,853,238 to Huang relates to a process for treating egg white or whole egg using microwave radiation, thereby rasing the temperature to 185° F. without significant thermal gelation. The patent also relates to the products obtained using this process. The patent states that the process causes the products to be virtually bacteria-free and to have extended shelf life under refrigeration.

U.S. Pat. No. 4,923,707 to Schoenberg relates to a low oil mayonnaise composition in which egg yolk is used as an emulsifier. U.S. Pat. No. 5,039,543 to Lee et al. relates to a process for preparing a flavorant with the flavor of cooked meat that comprises heating an aqueous mixture of a phospholipid and a sulfur-containing compound. The phospholipid may be from egg yolk.

U.S. Pat. No. 5,096,728 to Rapp relates to an improved method of pasteurizing liquid egg product in which an organosulfur compound is added to the liquid egg product in an amount that is effective to reduce coagulation under the heating conditions employed.

U.S. Pat. 5,314,706 to Colarow et al. relates to a heat-stable oil-in-water emulsion containing oil egg yolk and soybean lysophosphatidylcholine. The emulsion may include further ingredients for preparing sauces, mayonnaises, or salad dressings.

There remains a need for a source of enriched egg flavor that minimizes the content of undesired components of the egg such as fat and cholesterol from the flavoring composition. There is likewise a need for food compositions that contain enriched egg flavorings that minimize the content of unwanted components of eggs. There is furthermore a need for methods of obtaining enriched egg flavorings from eggs that may be used in preparing egg-flavored food compositions, and furthermore there is a need for methods of preparing egg-flavored food compositions that minimize the inclusion of components such as fat and cholesterol present in whole eggs. The present invention provides such compositions and methods.

SUMMARY OF THE INVENTION

The present invention provides two egg-flavor compositions. One such composition is a stabilized flavoring composition for imparting the flavor of egg which is prepared by treating egg yolk at elevated temperatures. Another such composition is an aqueous extract derived from hard cooked egg yolk. Both egg-flavor compositions can be used in a wide variety of food products.

First, the present invention provides a stabilized food flavoring composition that includes egg yolk treated at elevated temperature, and that imparts the flavor of egg to foods to which the composition is added. The heat treatment conditions (i.e., time and temperature of treatment) should be sufficient to provide a sticky, paste-like consistency. More specifically, the heat treatment conditions should be sufficient to provide an egg yolk paste having a Brookfield viscosity of about 15,000 to about 40,000 cP, and more preferably about 30,000 to about 40,000 cP, without converting a significant portion (i.e., less than about 5 percent and preferably less than about 1 percent) of the egg yolk to hard cooked yolk. For purposes of this invention, Brookfield viscosities are measured using a Brookfield RVTD model viscometer with a Helipath stand and "C" T-bar at about 5 rpm with a reading taken at one minute. For comparison, uncooked egg yolk has a Brookfield viscosity of about 2600 cP under similar conditions. Generally the elevated treatment temperature is in the range from about 65° C. to about 85° C. and continues for about 1 minute to about 60 minutes; more preferably, the temperature is in the range from about 70° C. to about 82° C. and continues for about 10 minutes to about 30 minutes; even more preferably, the temperature is in the range from about 72° C. to about 76° C. and continues for about 10 minutes to about 30 minutes. Optimum results appear to be obtained using a heat treatment temperature of about 74° C.

Second, the present invention provides a stabilized food flavoring composition for imparting the flavor of egg to foods, wherein the flavoring contains an aqueous extract of hard cooked egg yolk. Preferably, the aqueous extract is obtained by a process that includes the steps of (1) preparing an aqueous slurry of hard cooked egg yolk, (2) separating, preferably by centrifugation, the aqueous slurry to obtain an essentially solidcontaining portion and an essentially liquid supernatant portion, and (3) collecting the supernatant portion as the aqueous extract. Generally the aqueous slurry used in step (1) contains egg yolk and water in proportions of about 4:1 (w/w) to about 1:4 (w/w). More preferably, the proportion of egg yolk to water in the aqueous slurry is about 2:1 (w/w).

The invention also provides methods of preparing an egg-flavored food composition. In one such method, a food preparation to be flavored with egg flavoring is combined with a stabilized flavoring composition for imparting the flavor of egg; the flavoring composition includes egg yolk treated at an elevated temperature of about 65° C. to about 85° C. for about 1 minute to about 60 minutes, thereby providing the egg-flavored food composition. In a preferred embodiment of this method, the temperature is in the range from about 70° C. to about 82° C. and the treatment continues from about 10 minutes to about 30 minutes. In an even more preferred embodiment, the temperature is in the range from about 72° C. to about 76° C. and continues for about 10 minutes to about 30 minutes. The egg-flavored compositions of this invention can be used in food compositions such as, for example, mayonnaise spreads, salad dressings, desserts, and the like. Such food compositions may be full-fat, low-fat, or fat-free.

The invention further provides an additional method of preparing an egg-flavored food composition, said method comprising combining a food preparation to be flavored with an aqueous extract of hard cooked egg yolk, thereby providing the egg-flavored food composition. Preferably, the aqueous extract is obtained by a process that includes the steps of (1) preparing an aqueous slurry of hard cooked egg yolk, (2) centrifuging the aqueous slurry to obtain an essentially solid-containing portion and an essentially liquid supernatant portion, and (3) collecting the supernatant portion as the aqueous extract. Generally the aqueous slurry used in step (1) contains egg yolk and water in proportions of about 4:1 (w/w) to about 1:4 (w/w). More preferably, the proportion of egg yolk to water in the aqueous slurry is about 2:1 (w/w). The egg-flavored aqueous extract of this invention can be used in food compositions such as, for example, mayonnaise spreads, salad dressings, desserts, and the like. Such food compositions may be full-fat, low-fat, or fat-free.

The invention provides a further method of preparing an egg-flavored food composition that includes the step of combining a food preparation to be flavored with the flavor of egg and a stabilized flavoring composition for imparting the flavor of egg. Stabilized flavorings of this invention include (a) egg yolk treated at an elevated temperature of about 65° C. to about 85° C. for about 1 minute to about 60 minutes and/or (b) an aqueous extract of hard cooked egg. The heat-treated egg yolk and the aqueous extract may be used separately or in combination in food compositions.

These and other advantages of the present invention will become apparent to those skilled in the art upon consideration of the present specification.

DETAILED DESCRIPTION OF THE INVENTION

The present invention provides two egg-flavor compositions. One such composition is a stabilized flavoring composition for imparting the flavor of egg which is prepared by treating egg yolk at elevated temperatures. Another such composition is an aqueous extract derived from hard cooked egg yolk. Both egg-flavor compositions can be used in a wide variety of food products. These egg-flavor compositions allow the preparation of food compositions with the desired flavor components generally associated with egg yolk while incorporating lower levels of egg yolks. Moreover, the aqueous extract allows the incorporation of desired flavor components generally associated with egg yolk without the fat and cholesterol levels normally associated with egg yolk. The egg flavorings of the present invention can be employed in, for example, mayonnaise compositions, salad dressing compositions, desserts, and the like.

One method of the present invention involves the heat treatment of egg yolk. It has been found that treating egg yolk under the conditions described herein provides compositions with enhanced proportions of the components that impart the flavor of egg. These compositions and methods of treatment are not foreseen in the available art, and so are unexpected by one of skill in the arts of food chemistry and food formulations. Thus, in one preferred embodiment, the stabilized flavoring composition for imparting the flavor of egg may be obtained by subjecting egg yolk to treatment at elevated temperature. Generally, the elevated temperature is in the range from about 65° C. to about 85° C. for a time period of about 1 minute to about 60 minutes. More preferably, the elevated temperature is in the range from about 70° C. to about 82° C. and is continued for about 10 minutes to about 30 minutes. Even more preferably, the temperature is in the range from about 72° C. to about 76° C. and continues for about 10 minutes to about 30 minutes. Such heat treatment permit proper development of the flavor of egg in the egg yolk, without the undesired sulfury off-flavors or notes which can develop when conventional egg yolk formulations are used in food compositions.

The resulting heat-treated egg yolk compositions are suitable for use in food compositions that require prolonged storage. The food compositions containing the heat-treated egg yolk composition may be stored for extended periods of time under suitable conditions without either significant loss or degradation of the desired egg flavor. In contrast, uncooked liquid egg yolk generally fails to provide the correct and/or desired flavor of egg. Furthermore, uncooked liquid egg yolk, when incorporated into low fat or fatfree food compositions, generally imparts off flavors within a few days of storage that may be characterized as being "green" or "metallic."

The temperature and duration of the heating step appears to be critical in the preparation of the heated liquid egg yolk of this invention. For example, if liquid egg yolk is treated at temperatures greater than 85° C. for any significant time, the egg flavor of the resulting composition is significantly impaired (i.e., sulfury, burnt off-flavors). Thus, heating at 85° C. or above should be avoided. The heat treatment conditions (i.e., time and temperature of treatment) should be sufficient to provide a sticky, paste-like consistency. More specifically, the heat treatment conditions should be sufficient to provide an egg yolk paste having a Brookfield viscosity of about 15,000 to about 40,000 cP, and more preferably about 30,000 to about 40,000 cP, without converting a significant portion (i.e., less than about 5 percent and preferably less than about 1 percent) of the egg yolk to hard cooked yolk. Generally the liquid egg yolk should be heated to about 65° C. to about 85° C. for about 1 minute to about 60 minutes. More preferably, the elevated temperature is in the range from about 70° C. to about 82° C. and the heating is continued for about 10 minutes to about 30 minutes. Even more preferably, the temperature is in the range from about 72° C. to about 76° C. and continues for about 10 minutes to about 30 minutes.

The heated liquid egg yolk of this invention provides an egg flavoring composition which may be incorporated into a variety of food compositions in which egg flavoring is desired. Such food compositions include, by way of non-limiting example, mayonnaise compositions, salad dressings, desserts such as cakes, custards, pies, and the like. Such food compositions may be full-fat, low-fat, or fat-free. Thus, for example, an egg-flavored fat-free mayonnaise may be prepared by incorporating an appropriate amount of the liquid egg yolk treated at an elevated temperature. Such an amount, for example, may be from about 7% to about 9% by volume. If added to a fat-free mayonnaise composition, such a proportion is small enough to maintain the characterization of the composition as being fat-free. Comparable food compositions, such as low-fat mayonnaise, other mayonnaise compositions, salad dressings, desserts, and similar food products may be prepared in similar fashion.

Another egg flavor composition is prepared by extracting flavor components from hard cooked egg yolk using an aqueous slurry. In this method, the stabilized egg flavor composition is obtained by subjecting egg yolk to elevated temperatures high enough and for a time long enough to form hard cooked yolk. An aqueous slurry of the hard cooked egg yolk is then formed. The aqueous slurry is then separated into an essentially solid-containing portion and an essentially liquid supernate portion. The collected supernate portion is the desired flavor composition. The proportion of cooked egg yolk to water in the aqueous slurry ranges from about 4:1 to about 1:4 based on weight. More preferably, the proportion of cooked egg yolk to water in the aqueous slurry is about 2:1 based on weight. Suitable separation methods for treating the aqueous slurry are well known. These include, for example, sedimentation by gravity, centrifugation, filtration, as well as similar techniques. The aqueous liquid phase (i.e., the supernate) includes the rich flavor of egg without fat and cholesterol levels normally associated with egg yolk. More specifically, the supernate generally contains about 1.6 to 1.9 percent fat as compared to about 32 percent fat for untreated egg yolk and about 100 mg cholesterol per 100 g as compared to about 1500 mg per 100 g for untreated egg yolk. Thus, both the fat and cholesterol levels are substantially and significantly reduced. For purposes of this invention, a substantial reduction in either fat or cholesterol levels is considered to be at least a 75 percent reduction as compared to untreated egg yolk. More preferably, this reduction in fat and/or cholesterol levels is at least 90 percent as compared to untreated egg yolk.

This egg-flavored aqueous extract may be used in the preparation of food compositions into which the incorporation of the flavor of egg is intended.

Such food compositions include, for example, mayonnaise compositions, including fat-free and low-fat mayonnaises, other mayonnaise compositions, salad dressings, desserts, and the like. The egg-flavored extract may be substituted for part or all of the water normally formulated for incorporation into fat-free mayonnaise or other food products. Flavor perception of the fatfree mayonnaise or other food products can be significantly heightened while maintaining low fat and low cholesterol levels as compared to similar food products made with whole egg and/or egg yolks.

Thus, the present invention includes food compositions in which the flavor of egg is provided by either egg yolk treated at an elevated temperature and/or the aqueous extraction product of hard cooked egg yolk. Both methods provide excellent egg flavors without the fat and cholesterol levels normally associated with egg yolks. The following examples are intended to illustrate the invention and not to limit it. Unless indicated otherwise, all percentages and ratios are based on weight.

EXAMPLE 1

Pasteurized, homogenized, and salted liquid egg yolk (about 3 kg) was poured into a pre-heated (about 120° C.) stainless steel vessel (Groen mixer jacketed with medium pressurized steam) equipped with a plastic surface scraper. During heating, the yolk was stirred slowly and reached a temperature of 74° C. after 11 minutes after which it was cooled. The heat treated egg yolk had a sticky, paste-like consistency. No "green," "metallic," or "cardboard" off-flavors were observed.

Similar heat treated egg yolk products were subjected to analysis of volatile components by Aroma Extract Dilution Analysis (AEDA) using a temperature programable GC 3400 Gas Chromatograph (Varian Corporation). This analysis provides an objective measure of flavor that the consumer experiences in a more subjective fashion. Heat treatment resulted in increased intensities for the desirable sweet, yolky, and dairy attributes and, at the same time, reduced intensities for the undesirable green and musty attributes.

Heat treatment appears to produce desirable compounds not present and/or higher levels of desirable compounds relative to untreated liquid egg yolk. These compounds appear to mask, or to provide a balance for, aroma compounds that may be characterized as "green" or "metallic." Such green or metallic attributes often provide a high, and undesirable, aroma impact in non-heat treated liquid egg yolk. Generally, AEDA results were similar to results using trained sensory panels. Trained sensory panels generally found the heat treated egg yolk product to have more yolky, sweet aromatic, dairy, and sulfury attributes and less green and metallic attributes when compared to unpasteurized and pasteurized liquid egg yolk.

EXAMPLE 2

Pasteurized liquid egg yolk was hard cooked by exposure to a temperature sufficient to produce a hard cooked yolk. Although the time required is variable (due to batch size and equipment used), a temperature of about 70 to about 100° C. for about 10 to 45 minutes is generally sufficient.

In batch experiments, about 600 g of the resulting hard cooked yolk was blended with 300 g water using high speed Waring blender until a smooth slurry was formed (generally about 30 seconds blending). The slurry was centrifuged at 6000 rpm for 20 minutes. The supernatant was decanted and filtered through a double layer of cheesecloth.

In pilot plant studies, pasteurized, homogenized, and unsalted liquid egg yolk (about 100 lbs) was poured into a pre-heated (about 100° C.) stainless steel vessel equipped with a plastic surface scraper (Groen mixer with a water jacket. During heating to about 100° C., the yolk was stirred slowly. Heating was continued (generally about 30 to about 40 minutes) until hard cooked. The hard cooked egg yolk was blended with water in a 2:1 ratio in a Breddo mixer (high shear kettle mixer) until a smooth slurry was obtained (generally about 2 to about 5 minutes). The slurry was separated using a Sharples high speed, continuous centrifuge operating at 10,000 rpm and the aqueous extract collected.

Extract from both bench scale and pilot pant scale were analyzed and compared with the starting egg yolk. The following results were obtained:

|  | Fat | Cholesterol |
| --- | --- | --- |
| Egg Yolk | 32% | 1500 mg/100 g |
| Egg Yolk Extract | 1.6–1.9% | 100 mg/100 g |

The amount of fat was reduced by about 95 percent and the amount of cholesterol was reduced by about 93 percent; as can be seen, both fat and cholesterol content were dramatically and significantly reduced. The extract was characterized by a trained taste panel as having strong, full, and rich egg flavor.

EXAMPLE 3

A fat-free mayonnaise flavored with the egg-flavored heat treated egg yolk described in Example 1 (heat increased to 74° F. over an eleven minute period) and with an aqueous egg yolk extract as described in Example 2 was prepared using the following ingredients:

| Ingredients | Amount (%) |
| --- | --- |
| Water | 38.5 |
| Egg Yolk Aqueous Extract | 30.7 |
| Micro-reticulated Cellulose (MRC) | 9.0 |
| Heat Treated Salted Egg Yolk | 7.0 |
| Starch | 3.7 |
| Vinegar (120 gr.) | 3.2 |
| Sugar | 2.5 |
| Corn Syrup (42 DE) | 2.4 |
| Salt | 1.8 |
| Xanthan Gum | 0.5 |
| $TiO_2$/Cream Powder | 0.4 |
| Stabilizers | 0.1 |
| Flavorants | 0.2 |

The heated egg yolk, aqueous egg yolk extract, and water were mixed vigorously together to form a fine slurry. After adding the other dry and wet ingredients, the mixture was homogenized to form the desired fat-free mayonnaise. Use of heat treated egg yolk provided a texture and flavor in the fat-free mayonnaise which is close to that of a full fat mayonnaise. Such texture and flavor cannot be obtained using untreated liquid egg yolk in comparable food products. Moreover, the use of untreated liquid egg yolk in such a mayonnaise product generally results in a "green" or "metallic" taste in as few as three days storage at room temperature.

Four week aged samples of the fat-free mayonnaise containing both the aqueous extract and the heat treated egg yolk were evaluated using a trained panel and compared to freshly prepared fat-free mayonnaise containing untreated egg yolk. Only three panelists (out of eight) were able to correctly identify the aged sample from the fresh sample. Generally, the aged samples were found to be "more eggy" and to have a more cooked egg flavor than the fresh samples.

EXAMPLE 4

Fat-free mayonnaise containing egg-flavored aqueous extract of hard cooked egg yolk as prepared in Example 2 was prepared. The composition of the fat-free mayonnaise was essentially the same composition as described in Example 3. Water, starch, sugar, and vinegar were cooked to a fully gelatinous state in a stainless steel jacketed kettle with stirring at 85° C. and then cooled to room temperature. The remaining ingredients were blended together in a Hobart flat paddle mixer for about 5 minutes to form a homogeneous premix. The premix was further processed in a HSST homogenizer and then blended with the cooled starch base (54:46 ratio) in a Hobart mixer for about two minutes.

The fat-free mayonnaise prepared with the aqueous extract maintains the flavor of egg with high stability and with low fat and low cholesterol levels. Using a trained panel, fat-free mayonnaise prepared using the aqueous egg extract was compared to a similar fat-free mayonnaise prepared without the aqueous extract (i.e., control). Seven out of nine panelists preferred the fat-free mayonnaise prepared using the aqueous extract as compared to the control. This aqueous extract provides a strong, clean egg flavor and contains significantly reduced levels of fat and cholesterol.

We claim:

1. A stabilized food flavoring composition for imparting the flavor of egg, said flavoring comprises an aqueous extract of hard cooked egg yolk.

2. The composition as defined in claim 1, wherein the aqueous extract is obtained by a process comprising the steps of:
   (1) preparing an aqueous slurry of hard cooked egg yolk;
   (2) treating the aqueous slurry to form an essentially solids portion and an essentially liquid portion; and
   (3) collecting the liquid portion, wherein the liquid portion is the aqueous extract which contains the flavor of egg and which has substantially reduced levels of fat and cholesterol.

3. The composition as defined in claim 2, wherein the aqueous slurry is centrifuged to form the essentially solids portion and the essentially aqueous portion.

4. The composition as defined in claim 3, wherein the aqueous slurry contains egg yolk and water in proportions of about 4:1 to about 1:4 based on weight.

5. The composition as defined in claim 4, wherein the proportions of egg yolk and water is about 2:1 based on weight.

6. A food flavoring composition for imparting the flavor of egg that is essentially free of fat and cholesterol, said composition comprising an aqueous extract of hard cooked egg yolk obtained by a process comprising the steps of:
   (1) preparing an aqueous slurry of hard cooked egg yolk;
   (2) treating the aqueous slurry to form an essentially solids portion and an essentially liquid portion; and
   (3) collecting the liquid portion, wherein the liquid portion is the aqueous extract which contains the flavor of egg and which has substantially reduced levels of fat and cholesterol.

7. A composition as defined in claim 6, wherein the aqueous slurry contains egg yolk and water in proportions of about 4:1 to about 1:4 based on weight; and wherein the aqueous slurry is centrifuged to form the essentially solids portion and the essentially liquid portion.

8. A method of preparing an egg-flavored food composition, said method comprising the step of combining (1) a food preparation to be egg-flavored and (2) a stabilized flavoring composition for imparting the flavor of egg, wherein the flavoring composition comprises an aqueous extract of hard cooked egg yolk, thereby providing the egg-flavored food composition.

9. The method as defined in claim 8, wherein the aqueous extract is obtained by a process comprising the steps of:

(1) preparing an aqueous slurry of hard cooked egg yolk;

(2) treating the aqueous slurry to form an essentially solids portion and an essentially liquid portion; and (3) collecting the liquid portion, wherein the liquid portion is the aqueous extract which contains the flavor of egg and which has substantially reduced levels of fat and cholesterol.

10. The method as defined in claim 9, wherein the aqueous slurry is centrifuged to form the essentially solids portion and the essentially liquid portion.

11. The method as defined in claim 10, wherein the aqueous slurry contains egg yolk and water in proportions of about 4:1 to about 1:4 based on weight.

12. The method as defined in claim 11, wherein the aqueous slurry contains egg yolk and water in proportions of about 2:1 based on weight.

13. The method as defined in claim 9, wherein the food preparation is a low fat or fat-free mayonnaise spread, a salad dressing, or a dessert.

14. A method of preparing an egg-flavored food composition, said method comprising the step of combining (1) a food preparation to be flavored with egg flavoring and (2) a stabilized flavoring composition for imparting the flavor of egg;

wherein the stabilized flavoring composition comprises (a) egg yolk treated at an elevated temperature of about 65° C. to about 85° C. for a period of time of about 1 minute to about 60 minutes, and (b) an aqueous extract of hard cooked egg; thereby providing the egg-flavored food composition.

15. The method as defined in claim 14, wherein the elevated temperature for treatment of the egg yolk is about 70° C. to about 82° C. the period of time is about 10 minutes to about 30 minutes; and wherein the aqueous extract is obtained by a process comprising the steps of:

(1) preparing an aqueous slurry of hard cooked egg yolk;

(2) treating the aqueous slurry to form an essentially solids portion and an essentially liquid portion; and (3) collecting the liquid portion, wherein the liquid portion is the aqueous extract.

16. The method as defined in claim 15, wherein the aqueous slurry contains egg yolk and water in proportions of about 4:1 to about 1:4 based on weight.

17. The method as defined in claim 16, wherein the aqueous slurry contains egg yolk and water in proportions of about 2:1 based on weight.

18. The method as defined in claim 16, wherein the food preparation is a mayonnaise spread, a salad dressing, or a dessert.

19. The method as defined in claim 18, wherein the food preparation is low fat or fat-free.

* * * * *